United States Patent
Wang et al.

(10) Patent No.: US 9,559,607 B1
(45) Date of Patent: Jan. 31, 2017

(54) POWER SUPPLY AND DISTRIBUTION SYSTEMS AND OPERATING STRATEGY

(71) Applicant: ABB Technology Ltd., Zürich (CH)

(72) Inventors: Zhenyuan Wang, Apex, NC (US);
Sara Ahmed, Morrisville, NC (US);
Francisco Canales, Daettwil-Baden (CH)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 14/835,452

(22) Filed: Aug. 25, 2015

(51) Int. Cl.
*H02M 7/04* (2006.01)
*G06F 1/32* (2006.01)
*G06F 1/26* (2006.01)

(52) U.S. Cl.
CPC .............. *H02M 7/04* (2013.01); *G06F 1/263* (2013.01); *G06F 1/3287* (2013.01)

(58) Field of Classification Search
CPC ....................................................... H02M 7/04
See application file for complete search history.

(56) References Cited

U.S. PATENT DOCUMENTS

| | | | |
|---|---|---|---|
| 7,456,520 B2 * | 11/2008 | Colombi | H02J 9/062 307/43 |
| 7,462,954 B2 | 12/2008 | Kraus | |
| 7,602,625 B2 | 10/2009 | Belson et al. | |
| 2006/0284489 A1 | 12/2006 | Gross et al. | |
| 2010/0141039 A1 | 6/2010 | Belady et al. | |
| 2011/0148213 A1 | 6/2011 | Baldwin et al. | |
| 2012/0056481 A1 | 3/2012 | Corhodzic et al. | |
| 2015/0319803 A1* | 11/2015 | Hosny et al. | G01R 21/00 702/60 |
| 2016/0006253 A1* | 1/2016 | Saussele et al. | H02J 1/08 307/24 |

OTHER PUBLICATIONS

M. Baldwin, et al., "Higher Voltage DC(HCDC) Power Solutions for Critical Power Environments", Direct Power Technologies, at least as early as Oct. 6, 2014, 67 pgs.
N. Rasmussen,, "The Different Types of UPS Systems,", APC White Paper, at least as early as Oct. 6, 2014, 10 pgs.
M. Noritake, et al., "Verification of 380Vc Distribution System Availability Based on Demonstration Tests," at least as early as Oct. 6, 2014, 6 pgs.
E.C.W. DeJong, et al., "DC Power Distribution for Server Farms," Sep. 2007, 14 pgs.
N. Rasmussen et al., "A Quantitative Comparison of High Efficiency AC vs. DC Power Distribution for Data Centers," at least as early as Oct. 6, 2014, 22 pgs.
F. Bodi, System Architecture Reliability and Energy Efficiency, INTELEC 2011, 2 pgs.

* cited by examiner

*Primary Examiner* — Emily P Pham
(74) *Attorney, Agent, or Firm* — Taft Stettinius & Hollister LLP

(57) ABSTRACT

A power supply system includes an AC input interface, a DC output interface, and each of a single-conversion power supply path and a multi-conversion power supply path extending between the AC input interface and the DC output interface. Operating the system in a first or standard mode includes conveying electrical power between an AC power supply and an electrical load by way of the single-conversion power supply path. Operation in a second or non-standard operation mode includes conveying the electrical power by way of the multi-conversion power supply path.

16 Claims, 3 Drawing Sheets

US 9,559,607 B1

POWER SUPPLY AND DISTRIBUTION SYSTEMS AND OPERATING STRATEGY

TECHNICAL FIELD

The present disclosure relates generally to power supply systems and operating strategies, and more particularly to operating a power supply system so as to switch operation from a first mode supplying power from an electrical power supply to an electrical load via a single-conversion power supply path to a second mode supplying power via a multi-conversion path.

BACKGROUND

A great many different architectures and operating strategies have been proposed for electrical power supply and distribution over the years. In certain environments, it is desirable to have redundant or backup power available in the event of the failure of a primary power supply. One known design includes multiple, fully redundant pathways of essentially identical structure. Such systems provide reliable operation; however, there is always room for improvement.

SUMMARY

Operating a power supply system includes operating the system in a first mode where power is supplied via a single-conversion power supply path from an alternating current (AC) power supply to a direct current (DC) output coupled to an electrical load. Operation of the system can be switched to a second mode responsive to a fault in the single-conversion power supply path, such that electrical power is supplied via a multi-conversion power supply path.

DETAILED DESCRIPTION OF ILLUSTRATIVE EMBODIMENTS

Figure 1:
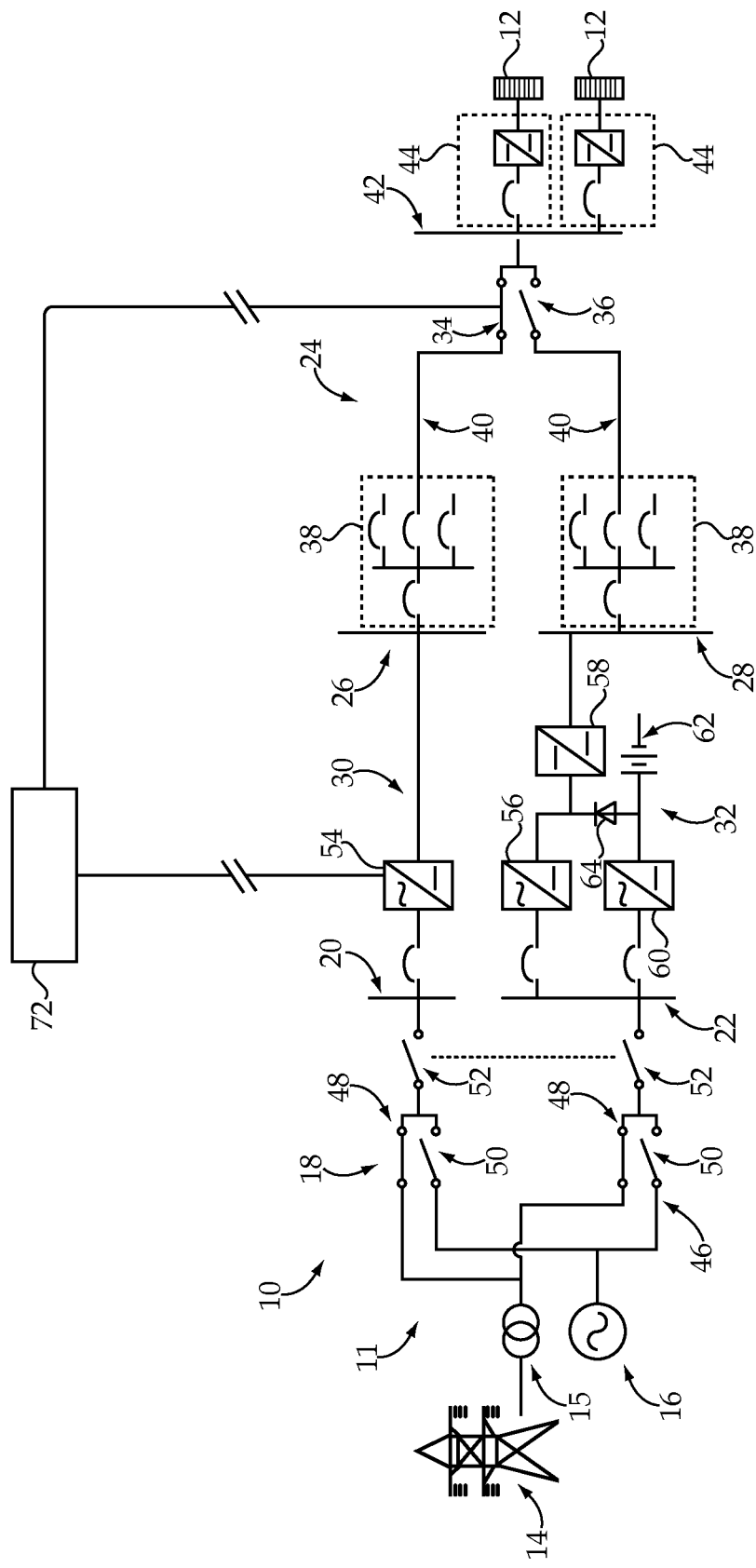
FIG. 1 is a diagrammatic view of a system, according to one embodiment.

For purposes of promoting an understanding of the principles of the POWER SUPPLY AND DISTRIBUTION SYSTEMS AND OPERATING STRATEGY, reference will now be made to the examples illustrated in the drawings, and specific language will be used to describe the same. It will nonetheless be understood that no limitation of the scope of the invention is intended by the illustration and description of certain examples of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to FIG. 1, there is shown an electrically powered computer system 10, according to one embodiment. System 10 may include a plurality of electrically powered computers, such as computer servers having non-volatile and also volatile memory, and depending for successful and continuous operation upon having an uninterrupted supply of electrical power. System 10 may be equipped with a power supply system 11, which may include or be part of an uninterruptible power supply (UPS) system, for continuously supplying electrical power to computers 12. A primary power supply 14, such as a three-phase alternating current (AC) electrical power grid may be coupled with system 11, such as by way of a step down transformer 15. A secondary power supply 16 may be coupled with or part of system 11. The terms primary and secondary should not be taken to mean that one of power supply 14 and power supply 16 is necessarily used preferentially over the other.

Power supply 16 might include a conventional electric generator such as a combustion engine-powered generator, but might alternatively include an electrical energy storage medium such as a capacitor bank, batteries, or a different type of power generating mechanism such as a fuel cell, a solar array, an energy storage flywheel or still another. System 11 may further include an AC input interface 18 having at least one AC bus 20, 22 structured to connect with AC electrical power supply 14. System 11 may also include a DC output interface 24 having at least one DC bus 42 structured to couple with an electrical load such as computers 12, to be supplied with electrical power from AC electrical power supply 14. While in the illustrated embodiment computers 12 are shown generally as stand-alone computers or computer servers such as in a data center, it should be appreciated that computers 12 might be part of computerized machinery, industrial processing equipment, or still another electro-mechanical system sensitive to power interruptions. As will be further apparent from the following description, system 11 is uniquely configured for reliability and redundancy in power supply while providing reduced costs and complexity as compared with known designs.

System 11 may further include a single-conversion power supply path 30 including electrical converter components further described herein, and being structured to convert medium voltage AC electrical current received via bus 20 or potentially bus 22 depending upon system architecture, to lower voltage DC electrical power to be supplied to DC output interface 24 and thus DC bus 42 in a first operating mode of system 11. The medium voltage AC might be from about 700 volts to about 800 volts and the lower voltage DC might be from about 350 volts to about 400 volts, although the present disclosure is not thusly limited.

System 11 may further include a multi-conversion power supply path 32 including electrical converter components further described herein, and being structured to convert medium voltage AC electrical power received via AC bus 26, 28 to higher voltage DC electrical power, and to convert higher voltage DC electrical power to lower voltage DC electrical power to be supplied to DC output interface 24 and thus DC bus 42, in a second operating mode of system 11. System 11 may still further include switching elements 34 and 36 coupled between output bus 42 and each of single conversion path 30 and multi-conversion path 32 so as to switch electrical connection paths between AC interface input 18 and DC output interface 24 and thereby transition system 11 between the first and second operating modes. Switching elements 34 and 36 may include an automated transfer switch (ATS), static transfer switches (STS), or some combination thereof depending upon application and system architecture.

In the illustrated embodiment a first DC bus 26 is coupled between output bus 42 and single-conversion supply path 30. A second DC bus 28 is coupled between output bus 42 and multi-conversion path 32. Each of busses 26 and 28 receives DC electrical power and current which is produced from AC electrical power supplied to bus 20 and/or bus 22 as the case may be. A DC power distribution unit 38 is coupled with bus 26 and a second DC power distribution unit 38 is coupled with bus 28. Each of power distribution units 38 includes a plurality of switches, potentially internal busses, circuit breakers, sensors, or other control and/or monitoring components, and is thereby structured to supply DC electrical power to a plurality of DC feeders, two of which are shown and coupled one with each of power distribution units 38. Those skilled in the art will appreciate that each power distribution unit 38 might supply several or even many DC feeders 40, with feeders 40 each extending in common to a plurality of DC output busses 42. Accordingly, while only two DC feeders are shown in FIG. 1, embodiments are contemplated where several DC feeders feed several DC busses from each power distribution unit 38.

Switching elements 34 and 36 are shown connecting DC feeders 40 with DC bus 42. It will therefore be apparent that DC bus 42 can be supplied with DC electrical power by way of switches 34 and 36 from either of DC feeders 40, and thus either of power supply paths 30 and 32. DC bus 42 may have the form of a remote power panel (RPP) that supplies multiple power supply units (PSU's) 44, with each PSU supplying a server computer 12. Switching elements 34 and 36 each include an active transfer switch (ATS) or a static transfer switch (STS) or some combination thereof. In a practical implementation strategy, switching elements 34 and 36 normally close to path 30 and are open to path 32, only transferring to path 32 if there is a fault in path 30 as further discussed herein. Power supplied by way of path 30 in the first mode mentioned above can therefore be understood as a standard mode, whereas operation by way of supplying electrical power via path 32 can be understood as a non-standard mode, although the present disclosure is not thereby limited.

In the illustrated embodiment, system 11 may also be equipped with switching elements 48 and 50 within input circuitry 36 in input interface 18. Switching elements 48 and 50 may be structured so as to selectively connect and/or disconnect power supplies 14 and 16 with either of paths 30 or 32. It will therefore be understood that power supply 16 can supply electrical power to path 30 or to path 32, whereas power supply 14 can likewise supply electrical power to either of path 30 or 32. Maintenance switches 52 may also be provided and structured for opening or closing to enable physical and/or electrical disconnection of components of system 11 from either of supplies 14 or 16.

It will be recalled that power supply path 30 includes electrical converter components structured to convert medium voltage AC power received via bus 20 to lower voltage DC electrical power to be supplied to bus 42. The terms higher, lower, and medium will be understood herein in a relative sense. In a practical implementation strategy, the electrical converter components can include an AC to DC buck converter, otherwise known as a buck rectifier 54. Buck rectifier 54 can be of a variety of different topologies and constructions, including a passive rectifier such as a thyristor-based passive rectifier. An actively controlled rectifier can also be used. The choice of rectifier may depend upon control and dynamics requirements of critical loads in computers 12, such as critical loads where computers 12 are part of a data center, and thus corresponding to a minimum electrical power supply requirement to avoid data losses. Harmonics requirements or properties of power supply 14 and also potentially power supply 16 can also affect selection of a suitable rectifier. Path 30 will typically have a constant DC voltage as determined by buck rectifier 54, thus enabling DC feeder 40 to have conductor sizes the same as in path 30. Those skilled in the art will appreciate instances where a variable voltage necessitates cabling and electrical power supply hardware that accommodates a relatively wide range of voltages. Conversion of electrical power within path 30 occurs in a total of one conversion stage between AC input interface 18 and DC output interface 24.

It will further be recalled that path 32 includes electrical converter components structured to convert medium voltage AC power to higher voltage DC power and to convert the higher voltage DC power to lower voltage DC power to be supplied to output interface 24 and thus DC bus 42. To this end, the electrical converter components in path 32 may include an AC to DC boost converter or boost rectifier 56, coupled with a DC to DC converter 58, in turn supplying bus 28. A battery 62 may be coupled with components 56 and 58 electrically between components 56 and 58 and feeds electrical power to bus 28 by way of a diode 64. Electrical power produced by battery 62 may have a varying voltage, however, the coupling of battery 62 to bus 28 by way of converter 58 allows voltage of electrical power supplied to DC feeder 40 to be decoupled from the varying voltage of battery 62, and thus fixed. A charger 60 is provided and coupled with bus 22, thus structured to charge battery 62 such as by trickle charging or the like. As discussed above, in certain embodiments a standard or normal operating condition can include supplying power via path 30, with switch 36 open but switch 52 and switch 48 or 50 closed such that charger 60 electrically connects with power supply 14 or power supply 16, and trickle charges battery 62. Charger 60 may be sized at a reduced capacity compared with rectifier 54 and rectifier 56, such as only about 10% to about 15% of the rectifiers' capacity, and all of the load of PSU 44 may be carried by path 30 a majority of the time. This means that combined system efficiency is determined principally by an efficiency of buck rectifier 54. Another way to understand these principals is that the path, power supply path 30, having only a single electrical converter component will generally determine the overall efficiency of system 11 since electrical power will predominately be supplied by way of the single conversion path.

Those skilled in the art of redundant and uninterruptible power supply systems will be familiar with the additional costs that typically accompany the addition of components. Additional components, additional connections, additional power supplies and duplications of hardware are typically understood to improve reliability, but of course typically increase costs. What is generally less intuitive is the addition of potential failure modes with the addition or duplication of hardware. In other words, a system that has many different components versus a relatively simpler system with fewer components will often at first impression appear to be more reliable. When a more quantitative consideration of the likelihood of failure of the overall system, as well as likelihood of failure of subcomponents of the system is conducted, however, as in the present instance it becomes apparent that likelihood of failure is not in fact increased or only modestly so, where some of the duplication and addition of hardware is avoided. In the present instance, therefore, a sufficiently reliable system can be provided even though one of the possible power supply paths has fewer components, and in fact lacks the backup power supply of an energy storage device altogether. When a fault occurs in path 32, system 11 can be switched to a backup mode where electrical power is supplied via battery 62. Conventional systems might have included multiple power supply paths that were substantially identical, with each including a battery or other energy storage device. In the present instance, it can be seen that only one of paths 30 and 32 includes a battery.

It can also be seen from FIG. 1 that a control device 72, such as an electronic control module including one or more suitable data processors and a computer memory, is coupled with path 30 and optionally with other components of system 11. Switching elements 34 and 36, or possibly other switches and for that matter any component of system 11 could be coupled with and in communication with control device 72. In one embodiment, control device 70 actively adjusts switching elements 34 and 36 to switch system 11 between operating modes in response to detection of a fault. In a practical implementation strategy, switching elements will operate to switch system 11 to the second mode automatically and in a manner transparent to the electrical loads powered thereby. Control device 72 can autonomously, or with intervention by a human administrator, operate switching elements 34 and 36 to return system 11 to the first operating mode when a fault has cleared. For instance, thyristors or other semiconductor components in switching elements 34 and 36 may autonomously operate to electrically disconnect path 30 and electrically connect path 32 to operate in the second mode, but require intervention to switch back to the first mode.

Figure 2:
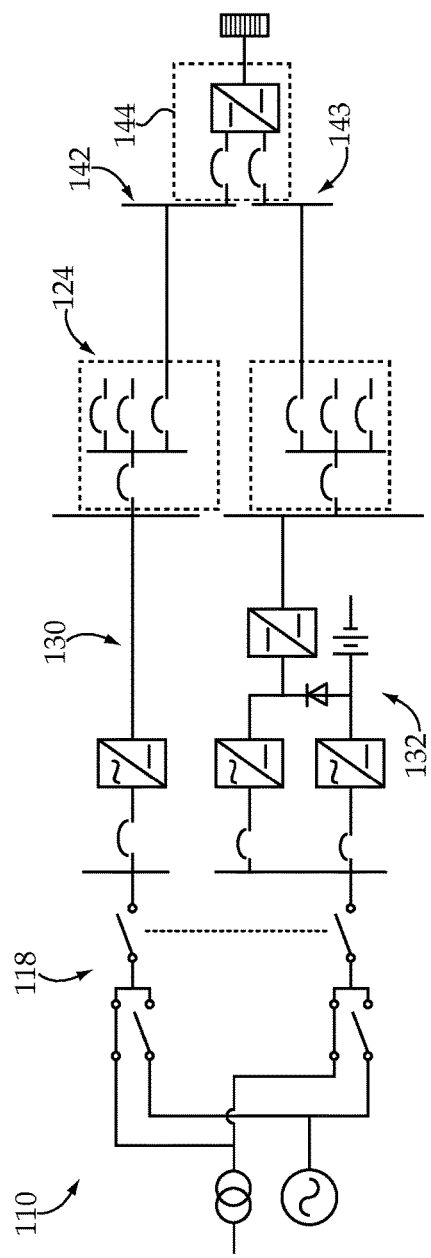
FIG. 2 is a diagrammatic view of a system according to another embodiment.

Referring now to FIG. 2, there is shown a system 110 according to another embodiment. System 110 may have features similar or identical to those of system 10 except where otherwise indicated and, namely, includes an input interface 118 and an output interface 124, a single-conversion power supply path 130 and a multi-conversion power supply path 132 coupled between input interface 118 and output interface 124. Rather than a single DC output bus or remote power panel that feeds multiple PSU's, in system 110 separate remote power panels 142 and 143 are provided which separately supply each PSU 144 from the voltage feeders corresponding to each power supply path 130 and 132.

Figure 3:
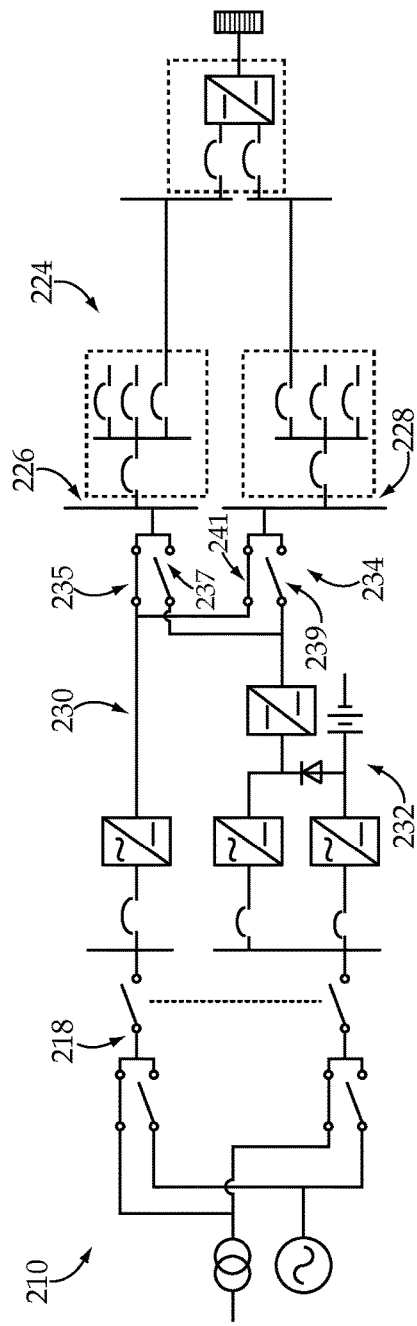
FIG. 3 is a diagrammatic view of a system according to yet another embodiment.

Referring to FIG. 3, there is shown yet another embodiment of a system 210 having features similar but not identical to those in the embodiments discussed above, including an input interface 218, an output interface 224, a single-conversion power supply path 230 and a multi-conversion power supply path 232. System 210 further includes switching elements between power supply paths 230 and 232 that enable the two paths to be coupled together. The switching elements may include automatic transfer switches (ATS's) or static transfer switches (STS's), or still other switching elements such as mechanical or electromechanical switches that require direct control or even human intervention. In the illustrated embodiment, a first switch 235 provides for connecting/disconnecting of path 230 to a bus 226, and a second switch 237 provides for connecting/disconnecting of path 232 to bus 226. A third switch 234 provides for connecting/disconnecting of path 234 to a bus 228, and a fourth switch provides 239 provides for connecting/disconnecting of path 230 to a bus 228.

Figure 4:
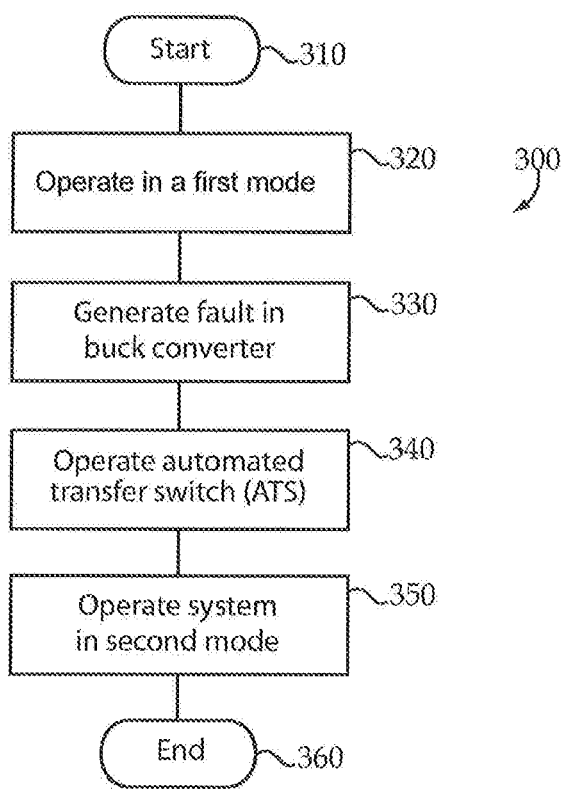
FIG. 4 is a flowchart illustrating example operating methodology according to one embodiment.

Referring to the drawings generally, but in particular to FIG. 4 there is shown a flowchart 300 illustrating an example operating process according to the present disclosure. The process may START at block 310, and advances to block 320 where system 11 is operated in a first mode, such as a standard mode where electrical power is supplied via path 30 in the case of the embodiment of FIG. 1. From block 320, the process may advance to block 330 where a fault is generated in buck converter 54. The fault could be a failure of electrical connectivity, exceeding of a temperature or voltage threshold, or some other occurrence. From block 330 the process may advance to block 340 to operate switching elements 34 and 36. From block 340 the process may advance to block 350 to operate system 11 in the second mode, such as a non-standard mode where electrical power is supplied via path 32 in the case of the FIG. 1 embodiment. A control device such as control device 72 could be monitoring operations and conditions in system 11, and command switching back to the first operating mode once a fault is cleared. From block 350, the process may advance to END at block 360.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A method of operating a power supply system comprising:
    operating the power supply system in a first mode, such that electrical power is supplied via a single-conversion power supply path from an alternating current (AC) input interface coupled to an AC power supply to a direct current (DC) output interface coupled to an electrical load;
    converting medium voltage AC electrical power supplied from an AC bus of the AC input interface to lower voltage DC electrical power supplied to a DC bus of the DC output interface, during an operation in the first mode;
    switching operation of the power supply system to a second mode responsive to a fault in the single-conversion power supply path, such that electrical power is supplied via a multi-conversion power supply path from the AC input interface to the DC output interface; and
    converting medium voltage AC electrical power supplied from the AC bus to higher voltage DC electrical power, and converting the higher voltage DC electrical power to lower voltage DC electrical power supplied to the DC output interface, during an operation in the second mode.

2. The method of claim 1 wherein switching operation includes electrically connecting the multi-conversion power supply path between the AC input interface and the DC output interface, and electrically disconnecting the single-conversion power supply path.

3. The method of claim 2 wherein converting the medium voltage AC to lower voltage DC includes converting the electrical power by way of an AC to DC buck converter.

4. The method of claim 3 wherein converting the medium voltage AC to higher voltage DC includes converting the electrical power by way of an AC to DC boost converter.

5. The method of claim 1 further comprising switching operation of the power supply system from operation in the second mode to operation in a backup mode responsive to a fault in the multi-conversion power supply path, and feeding DC electrical power to the DC output interface from a backup energy storage device during the operation in the backup mode.

6. A power supply system comprising:
an alternating current (AC) input interface including at least one AC bus structured to couple with an AC electrical power supply;
a direct current (DC) output interface including at least one DC bus structured to couple with an electrical load to be supplied with electrical power from the AC electrical power supply;
a single-conversion power supply path including electrical converter components structured to convert medium voltage AC electrical power received via the at least one AC bus to lower voltage DC electrical power to be supplied to the at least one DC bus in a first operating mode of the UPS system;
a multi-conversion power supply path including electrical converter components structured to convert medium voltage AC electrical power received via the at least one AC bus to higher voltage DC electrical power, and to convert the higher voltage DC electrical power to lower voltage DC electrical power to be supplied to the DC output interface, in a second operating mode of the UPS system; and
switching elements coupled between the at least one DC output bus and each of the single-conversion and multi-conversion power supply paths so as to switch electrical connection paths between the AC input interface and the DC output interface and transition the power supply system between the first and second operating modes.

7. The system of claim 6 wherein the DC output interface further includes DC feeders coupled between each of the single-conversion and multi-conversion power supply paths and the at least one DC bus.

8. The system of claim 7 wherein the electrical converter components in the single-conversion power supply path include components of an AC to DC buck converter.

9. The system of claim 7 wherein the AC input interface further includes circuitry for connecting to each of the AC power supply and a secondary power supply, and switching elements for connecting either of the AC power supply and the secondary power supply to either one of the single-conversion and multi-conversion power supply paths.

10. The system of claim 7 wherein the electrical converter components in the single-conversion power supply path are fewer in number than the electrical converter components in the multi-conversion power supply path.

11. The system of claim 7 wherein the electrical converter components in the multi-conversion power supply path include an AC to DC boost converter, and a DC to DC converter.

12. The system of claim 11 further comprising an energy storage device coupled with the multi-conversion power supply path.

13. The system of claim 12 wherein the energy storage device includes a battery coupled with the multi-conversion power supply path at a location electrically between the AC to DC boost converter and the DC to DC converter such that a voltage of DC electrical power supplied from the energy storage device to the DC output bus is decoupled from a voltage of the energy storage device.

14. The system of claim 12 further comprising switching elements coupled between the single and multi-conversion power supply paths.

15. The system of claim 7 further comprising a first power distribution unit and a second power distribution unit coupled between the single-conversion and multi-conversion power supply paths and the at least one DC output bus, respectively.

16. An electrically powered computer system comprising:
a plurality of computers;
a power supply system including an electrical power input interface structured to connect with an electrical power supply, and an electrical power output interface structured to supply the plurality of computers with electrical power from the electrical power supply;
a single-conversion power supply path coupled between the input interface and the output interface, and including electrical converter components structured to convert electrical power between alternating current (AC) and direct current (DC), and from a first voltage received at the input interface to a second voltage supplied to the output interface;
a multi-conversion power supply path coupled between the input interface and the output interface, and including electrical converter components structured to convert electrical power between AC and DC, from the first voltage received at the input interface to a third voltage, and from the third voltage to the second voltage supplied to the output interface; and
switching elements coupled between the output interface and each of the single-conversion and multi-conversion power supply paths so as to switch electrical connections between the input interface and the output interface from one of the single-conversion power supply path and the multi-conversion power supply path to the other, responsive to a fault in the one.

* * * * *